Figure 1:
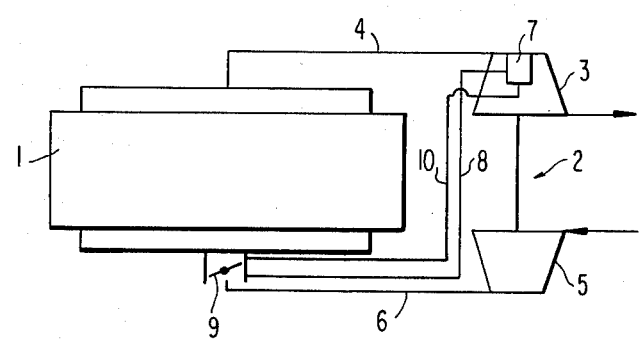

United States Patent [19]

Withalm et al.

[11] 4,271,672

[45] Jun. 9, 1981

[54] INTERNAL COMBUSTION ENGINE WITH AN EXHAUST GAS TURBOCHARGER

[75] Inventors: Gert Withalm, Stuttgart; Hermann Hiereth, Esslingen, both of Fed. Rep. of Germany

[73] Assignee: Daimler-Benz Aktiengesellschaft, Stuttgart, Fed. Rep. of Germany

[21] Appl. No.: 896,031

[22] Filed: Apr. 13, 1978

[30] Foreign Application Priority Data

Apr. 14, 1977 [DE] Fed. Rep. of Germany ....... 2716470

[51] Int. Cl.³ ............................................. F02B 37/12
[52] U.S. Cl. .................................................... 60/602
[58] Field of Search ................... 60/600, 602, 603, 605

[56] References Cited

U.S. PATENT DOCUMENTS

| 2,380,777 | 7/1945 | Moss ........................................ 60/600 |
| 2,731,792 | 1/1956 | Nallinger ................................. 60/605 |
| 3,195,805 | 7/1965 | Cholvin et al. ..................... 60/602 X |
| 3,941,035 | 3/1976 | Mueller .............................. 60/602 X |
| 4,005,578 | 2/1977 | McInerney ............................. 60/602 |

Primary Examiner—Michael Koczo, Jr.
Attorney, Agent, or Firm—Craig and Antonelli

[57] ABSTRACT

An internal combustion engine with an exhaust-gas turbocharger, particularly a mixture-compressing internal combustion engine, in which a bleeder valve is provided which during the operation of the internal combustion engine in the partial load range conducts the exhaust gases in bypassing relationship to the turbine of the exhaust gas turbocharger.

3 Claims, 2 Drawing Figures

INTERNAL COMBUSTION ENGINE WITH AN EXHAUST GAS TURBOCHARGER

The present invention relates to an internal combustion engine with an exhaust gas turbocharger, especially to a mixture-compressing internal combustion engine.

In a mixture-compressing internal combustion engine, no advantage results from the operation of the exhaust gas turbocharger within the partial load range approximately up to suction pipe pressures of 760 mm Hg, because the charging pressure of the compressor is again reduced at the throttle valve. The turbine merely builds up unused counter-pressure which again adversely affects the gas exchange in the sense of an increase of the fuel consumption.

The present invention is concerned with the task of reducing the gas-exchange work in the partial load range operation of the internal combustion engine and reducing the fuel consumption.

The underlying problems are solved according to the present invention in that a bleeder valve or by-pass valve is provided which, during the operation of the internal combustion engine in the partial load range, conducts the exhaust gases about the turbine of the exhaust gas turbochargers, i.e., in by-passing relation thereto.

This measure has as a consequence a lowering of the counter-pressure in the exhaust system of the internal combustion engine, by means of which again the gas-exchange work and the fuel consumption dependent therefrom is considerably reduced. The bleeder or by-pass valve may be actuated advantageously electromagnetically, mechanically, hydraulically or pneumatically.

In an internal combustion engine with an existing full load bleeder or by-pass valve for exhaust gases for limiting maximum charging pressure, the present invention can be realized in a simple manner in that the full-load bleeder or by-pass valve for limiting the maximum charging pressure is so constructed that it can also be used as bleeder or by-pass valve in the partial load range of the internal combustion engine.

Insofar as the full-load bleeder or by-pass valve includes a valve member which is displaced in an opening direction by a movable wall, preferably a diaphragm, against the action of a compression spring upon exceeding a predetermined pressure in the inlet system of the internal combustion engine upstream of a throttle valve arranged thereat, according to a further feature of the present invention, the valve member may be connected with a second movable wall, preferably a diaphragm, on which acts the vacuum prevailing in the inlet system downstream of the throttle valve in the opening direction of the valve member.

Accordingly, it is an object of the present invention to provide an internal combustion engine with an exhaust gas turbocharger, especially a mixture-compressing internal combustion engine, which avoids by simple means the aforementioned shortcomings and drawbacks encountered in the prior art.

Another object of the present invention resides in an internal combustion engine with an exhaust gas turbocharger, in which the build-up of unused counter-pressures of the turbine is effectively minimized within undesired load ranges.

A further object of the present invention resides in an internal combustion engine with an exhaust gas turbocharger, in which the gas-exchange work and therewith the fuel consumption is effectively reduced in the partial load range.

Still a further object of the present invention resides in an internal combustion engine with an exhaust gas turbocharger in which the gas-exchange work in the partial load range is reduced by extremely simple structural means utilizing existing parts.

Figure 2:
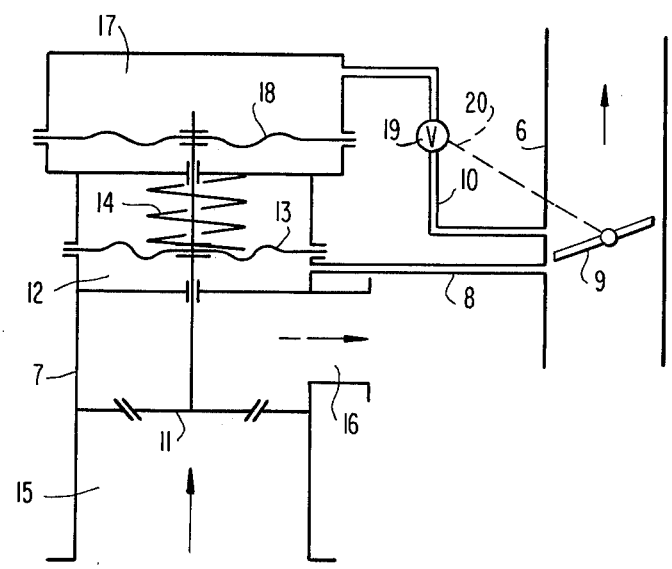

These and other objects, features and advantages of the present invention will become more apparent from the following description when taken in connection with the accompanying drawing which shows, for purposes of illustration only, one embodiment in accordance with the present invention, and wherein:

FIG. 1 is a schematic view of an internal combustion engine with an exhaust gas turbocharger in accordance with the present invention; and FIG. 2 is a schematic cross-sectional view through the bleeder or by-pass valve in accordance with the present invention.

Referring now to the drawing wherein like reference numerals are used throughout the two views to designate like parts, according to FIG. 1 an internal combustion engine 1 is equipped with an exhaust-gas turbocharger generally designated by reference numeral 2, whose turbine 3 is connected to the exhaust system 4 of the internal combustion engine and whose compressor 5 is connected to the inlet system 6. A full-load bleeder or by-pass valve 7 is connected to the turbine 3, which is connected by way of a line 8 with the inlet system 6 upstream of the throttle valve 9 arranged therein. The full-load bleeder or by-pass valve 7 conducts a predetermined quantity of exhaust gases about the turbine 3, i.e., in by-passing relationship thereto, during excessive charging pressures in the inlet system 6 of the internal combustion engine 1. The full-load bleeder or by-pass valve 7 is so constructed that it also conducts exhaust gases about the turbine 3, i.e., in by-passing relationship thereto, in the partial load range operation of the internal combustion engine 1. For this purpose, the full load bleeder or by-pass valve 7 is additionally connected by means of a line 10 with the inlet system 6 downstream of the throttle valve 9.

As can be seen more clearly from FIG. 2, the full load bleeder or by-pass valve 7 includes a valve member 11. This valve member 11 will be lifted at a predetermined pressure in the inlet system 6 of the internal combustion engine 1, which is effective upstream of the throttle valve 9, in the line 8 and in the space 12, by the diaphragm 13 against the action of a compression spring 14 so that exhaust gases are conducted out of the space 15 in communication with the exhaust system 4 past the valve member 11 in the direction toward the connecting stub 16 at the turbine, which, for example, may be operatively connected with the exhaust system downstream of the turbine 3.

For purposes of bleeding or by-passing at partial loads, a further space 17 is provided above the space 12 subdivided by the diaphragm 13, in which a further diaphragm 18 is arranged that is connected with the valve member 11. The space 17 is operatively connected by way of the line 10 with the inlet system 6 downstream of the throttle valve 9 so that the vacuum establishing itself in the inlet system 6 at partial load operation of the internal combustion engine 1 lifts the valve member 11 by means of the diaphragm 18 against the action of the compression spring 14 and exhaust gases from the space 15 can again be conducted past the turbine 3. In order to assure that an opening of the valve member 11 takes place by means of the diaphragm 18 only at partial loads, a shifting valve 19 is arranged in the line 10 which is controlled in a suitable manner by conventional means.

For example, the shifting valve 19 may be connected by conventional means to the throttle valve 9, as shown illustratively by dash line 20.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A mixture-compressing internal combustion engine which includes a means for forming a fuel-air mixture, and an exhaust gas turbocharger means operatively connected with an exhaust gas system of the internal combustion engine, the exhausted gas turbocharger means including a compressor means operatively connected with an inlet system of the internal combustion engine and a turbine means, characterized in that a bleeder valve means is operatively connected to the turbine means and inlet system of the internal combustion engine, the bleeder valve means includes first means responsive to a vacuum in the inlet system for by-passing exhaust gases from the exhaust gas system about the turbine means of the exhaust gas turbocharger means during a partial load operation of the internal combustion engine, the bleeder valve means includes second means responsive to a predetermined pressure in the inlet system for limiting a maximum charging pressure of the turbocharger means during a full load operation of the internal combustion engine, wherein a shifting valve means is associated with said first means for assuring the operation of said first means solely at the partial load operation.

2. An internal combustion engine according to claim 1, wherein a throttle valve means is arranged in the inlet system, characterized in that said bleeder valve means further includes a valve member for controlling a flow of exhaust gases from the exhaust gas system, the means second for limiting the maximum charging pressure includes a spring means for normally urging the valve member into a closed postion, a movable wall means operatively connected to the valve member so as to control a positioning thereof, means communicating with the inlet system of the internal combustion engine at a position upstream of the throttle valve means for causing the wall means to be moved upon exceeding a predetermined pressure in the inlet system so as to displace the valve member into an open position, the first means includes a second movable wall means operatively connected with the valve member for controlling a positon thereof, and in that means communicating with the inlet system at a position downstream of the throttle valve means are provided for causing the second wall means to be moved upon an occurrance of a predetermined vacuum in the inlet system so as to displace the valve member into an open position.

3. An internal combustion engine according to claim 2, characterized in that both of said movable wall means are constructed as diaphragms.

* * * * *